US012591265B2

(12) United States Patent
Wick et al.

(10) Patent No.: US 12,591,265 B2
(45) Date of Patent: Mar. 31, 2026

(54) APPARATUS FOR TIMESTAMP PROCESSING

(71) Applicant: Swabian Instruments GmbH, Stuttgart (DE)

(72) Inventors: Markus Wick, Plochingen (DE); Helmut Fedder, Stuttgart (DE); Michael Schlagmüller, Ditzingen (DE)

(73) Assignee: SWABIAN INSTRUMENTS GMBH, Stuttgart (DE)

( * ) Notice: Subject to any disclaimer, the term of this patent is extended or adjusted under 35 U.S.C. 154(b) by 50 days.

(21) Appl. No.: 18/700,478

(22) PCT Filed: Oct. 17, 2022

(86) PCT No.: PCT/EP2022/078844
§ 371 (c)(1),
(2) Date: Apr. 11, 2024

(87) PCT Pub. No.: WO2023/072663
PCT Pub. Date: May 4, 2023

(65) Prior Publication Data
US 2024/0411338 A1      Dec. 12, 2024

(30) Foreign Application Priority Data

Oct. 29, 2021    (EP) ..................................... 21205642

(51) Int. Cl.
G06F 1/04          (2006.01)
(52) U.S. Cl.
CPC ..................................... G06F 1/04 (2013.01)

(58) Field of Classification Search
None
See application file for complete search history.

(56) References Cited

U.S. PATENT DOCUMENTS

| | | | |
|---|---|---|---|
| 7,804,290 | B2 | 9/2010 | Henzler et al. |
| 10,715,754 | B2 | 7/2020 | Moore et al. |

(Continued)

FOREIGN PATENT DOCUMENTS

| | | |
|---|---|---|
| DE | 102008004549 B4 | 4/2013 |
| DE | 102008046831 B4 | 12/2017 |
| WO | 2012137109 A2 | 10/2012 |

OTHER PUBLICATIONS

International Search Report and Written Opinion for Application No. PCT/EP2022/078844, dated Jan. 19, 2023, 13 pages.

(Continued)

*Primary Examiner* — Paul Yen

(74) *Attorney, Agent, or Firm* — Carter, DeLuca & Farrell LLP

(57)          ABSTRACT

There is provided an apparatus for processing timestamps generated by two or more time-to-digital converters (TDCs) that comprises: at least two TDCs, a reference clock, a counter and a stream generator that output a timestamp data stream (TD #1), a first input signal that is periodic or quasi periodic, a second input signal, an electronic circuit or computer program that takes said timestamp data stream as an input and generates a new timestamp data stream (TD #2). Said electronic circuit or computer program performs refining and rescaling calculations thereby providing means to enhance the accuracy of a plurality of timestamps and to express a plurality of timestamps in a different time reference frame.

7 Claims, 4 Drawing Sheets

(56)         References Cited

U.S. PATENT DOCUMENTS

2003/0076181  A1      4/2003   Tabatabaei et al.
2009/0072812  A1      3/2009   Henzler et al.
2009/0074124  A1      3/2009   Henzler

OTHER PUBLICATIONS

Extended European Search Report for Application No. 21205642.8
dated Apr. 7, 2022, 7 pages.

- Prior Art -

- Prior Art -

- Prior Art -

- Prior Art -

Fig. 4

- Prior Art -

Fig. 5

APPARATUS FOR TIMESTAMP PROCESSING

FIELD OF THE INVENTION

The invention concerns an apparatus for processing timestamps generated by two or more time-to-digital converters (TDCs) that are driven by a common reference clock. There are provided advantages in time measurement technology. The described apparatus improves the accuracy of timestamps generated from periodic or quasi periodic signals and enable switching the time reference of timestamps. The described apparatus is particularly useful for test and measurement applications where precise timestamps are compared, such as fluorescence lifetime measurements, clock comparison measurements, photonic quantum computing and quantum communication.

DESCRIPTION OF RELATED ART

A time tagger is an instrument that is used to detect edges of an electronic signal and to determine their time of arrival. It typically comprises two or more TDCs that are driven by a common reference clock. For each edge of an input signal, each TDC outputs a timestamp that encodes the time-difference between the input signal edge and an edge of the reference clock signal. An electronic circuit or computer program merges and sorts the timestamps from all TDCs into a data stream with increasing order according to their occurrence in time and combines each time value with a number that identifies the TDC from which it originated.

The stream generator also counts the edges of the reference clock and converts the time values into timestamps relative to a specific clock edge that corresponds to time zero, meaning that the timestamps in the data stream are now values larger than the period of the reference clock. The stream generator may also include counter rollover markers in the data stream. This data stream of timestamps is received by a digital electronic circuit or computer program and further processed in a way that is specific to each measurement application.

For example, in a fluorescence lifetime measurement (FIG. 2), one TDC receives the signal from a single photon detector and a second TDC receives the signal from a pulsed laser. For each photon timestamp, the time difference to the preceding or subsequent laser timestamp is calculated and counted in a histogram. In this way, a fluorescence decay curve of a sample is obtained.

In another example (FIG. 3), two independent clock oscillators that output one-pulse-per-second (1 PPS) signals and 10 MHz clock signals are connected to a time tagger. In one type of clock comparison measurements, at every second, the time difference between the two 1 PPS pulses is calculated and logged into a continuous plot that represents the relative timing accuracy and clock drift of the GNSS receivers over time. In another type of clock comparison measurements the 10 MHz clock signals are compared to each other and an Alan deviation is calculated from the timestamps of the clock edges of both clocks, providing a quantitative analysis of the long term clock stability, including long term drift, aging, phase noise spectrum, etc. Sometimes a clock dividers are used to first divide both 10 MHz signals to slower signals, for example 1 MHz, in order to reduce the data rate of the measured timestamps.

In yet another example (FIG. 4), the TDCs are used to realize a multi-channel logic analyzer. The timestamps of all rising and falling edges are streamed to a computer and from the timestamps a plot is created that visualizes the original digital signals.

In yet another application (FIG. 5), the TDC receives the signals from an array of single photon detectors and a computer program processes the timestamp data stream to identify timestamps that coincide with timestamps on one or more other channels within a certain time window.

Yet another application is a LIDAR or laser ranging measurement, where the trigger signal of a pulsed light source is connected to one TDC and an optical detector is connected to a second TDC. A digital circuit or computer program calculates the time difference between the timestamps from the trigger from the light source and the optical detector, which is the time of flight, and converts this into a distance.

We have described applications, where differences between timestamps are calculated and further processed to achieve certain measurement tasks. A time tagger, offers a generic and versatile solution to these diverse measurement tasks. Today, products by several companies are available that implement a time tagger completely or in parts. In addition to the Applicant, these include PicoQuant GmbH, Berlin, Becker & Hickl GmbH, Berlin, qutools, Munich, and Universal Quantum Devices, Waterloo (Canada).

In the described applications, sometimes one of the signals that is detected and processed by the time tagger is a periodic signal. In this case a time tagger has specific disadvantages that we describe below.

To understand these disadvantages, we first discuss a simpler approach of a fluorescence lifetime measurement as illustrated in FIG. 1. It uses a single TDC. The periodic pulsed laser is applied to the "stop" input of the TDC and the single photon detection events are applied to the "start" input of the same TDC. Since single photon events are conceptually "stop" events (photons are fluorescence light that is emitted after a laser excitation), this scheme is sometimes called a "reverse-start-stop-measurement" in the literature [B&H single photon counting book]. This scheme performs a direct measurement of the time-difference between a single photon detection event and a subsequent laser trigger. These time-differences can then directly be accumulated in a histogram.

We now discuss distinct disadvantages related to the use of a time tagger in the case of a fluorescence lifetime measurement. TDCs suffer from electronic jitter that results in an inaccuracy of the measured time-difference between the start and stop signals. When using the simple scheme with a single TDC (FIG. 1), the measurement jitter occurs once. When using a time tagger (FIG. 2), the measurement jitter occurs twice. Consequently, for typical gaussian distributed jitter, the total jitter of a measured time difference is worse by a factor SQRT(2). Second, in some cases, the pulsed laser has an excellent clock accuracy in terms of absolute frequency—for example when a mode locked laser is used that has a well calibrated resonator length. In this case, it may be desired that the period of the pulsed laser serves as the reference time for the measurement. When using the simple scheme with a single TDC, the absolute measure of time is indeed given by the repetition rate of the stable pulsed laser, whereas, when using a time tagger, the absolute measure of time is determined by the reference clock oscillator, which is often less accurate as compared to the laser. These disadvantages are inherent to the use of a time tagger, and they have not yet been addressed.

DE102008004549B4 "Apparatus and method for simultaneous time resolved single photon registration from a plurality of detection channels" describes a time tagger as detailed above, characterized by the aspect that each TDC generates a rollover marker, and characterized further by the fact that the apparatus is applied in the context of multi channel single photon counting, and characterized further by its specific timing resolution between 0.5 and 50 ps.

U.S. Pat. No. 10,715,754B2 "Single reference clock time to digital converter" discloses a method related to LIDAR and similar time-of-flight measurements with SPAD arrays that uses a multi-channel TDC with a common reference clock and processing logic for the signals from a SPAD array, where the common reference clock of the TDCs is synchronized with the laser pulse generator. While in that patent DSP signal processing of time-differences is described to evaluate measured time-differences and compute distances, the rescaling and refining data processing as described in the present submission, was not disclosed.

U.S. Pat. No. 7,804,290 B2, US 2009/0072812 A1 "Event-driven time-interval measurement" and DE102008046831B4 "Event-controlled time interval measurement" recognize the limitations that arise when operating a TDC with a reference clock rather than measuring time-differences directly. The authors state " . . . there are many potential problems with using a time-to-digital converter (TDC) that relies on a reference clock. Therefore, it may be desirable to accurately measure time intervals without the need for a reference clock." However, the authors approach the problem from an entirely different perspective and they propose: "One way this may be accomplished is to provide an event-driven time measurement device having one or more TDCs, where each TDC measures a time interval between trigger events in a signal to be measured based on nothing more than the relative timing of the trigger events." The central idea is to implement an event generator that outputs a series of triggers for each start and stop signal and these are then used to measure a time difference.

BRIEF SUMMARY OF THE INVENTION

It is the aim of the invention to remove the described limitations of time tagger measurements. The description provides an apparatus that improves the accuracy of timestamps related to periodic or quasi periodic signals and enables rescaling of the time basis of timestamps.

By quasi periodic signal, we mean a periodic signal where some of the edges are missing.

The description employs processing methods that operate on timestamp data streams with low latency, for example less than a second, thereby generating new timestamp data streams.

The description employs refinement calculations on a timestamp data stream. As a key inventive step we realize that a highly robust averaging calculation can effectively be realized by a control loop mechanism that continuously processes the timestamp data stream. Assuming independent normal distributed measurement jitter for each generated timestamp, the jitter of a timestamp can be improved by a factor $SQRT(N)$ by taking into account N earlier or later timestamps that occurred at known multiples of a clock period. With the help of a continuous calculation, timestamps in a data stream that originate from a specific TDC are replaced by more accurate timestamps. These can then be used for further processing.

The invention also applies rescaling of timestamps in a timestamp data stream, where a periodic input signal that is applied to one TDC is considered to be a reference clock signal and a suitable algorithm such as linear interpolation rescales the timestamps that originate from other TDCs. Such a rescaling calculation is useful, as it allows to express the values of measured timestamps relative to an external clock signal that is distinct from the internal reference clock and distinct from a special provided external hardware reference clock. Instead timestamps can now be expressed with respect to time information that is contained in any other input signal.

This enables a flexible way for the user to switch between time references.

It is another key characteristic of the invention that the averaging and rescaling calculations are performed on-the-fly on the data stream, meaning with a low latency, typically below one second. This ensures that the data can immediately be further processed or displayed. Being able to see measurement results in real time is an important added value for many applications.

Such processing of the timestamp data stream may be performed in a dedicated electronic circuit, such as an FPGA core, or it may be performed by a suitable software program that is executed by a processing unit.

Our description may apply only refinement calculation, only rescaling calculations or the combination of the two, i.e., timestamps from one TDC may be refined and the refined timestamps are subsequently used to rescale timestamps from another TDC.

BRIEF DESCRIPTION OF THE DRAWINGS

Related art will be understood with the aid of the corresponding section and illustrated by figures, in which

Figures 4, 5:
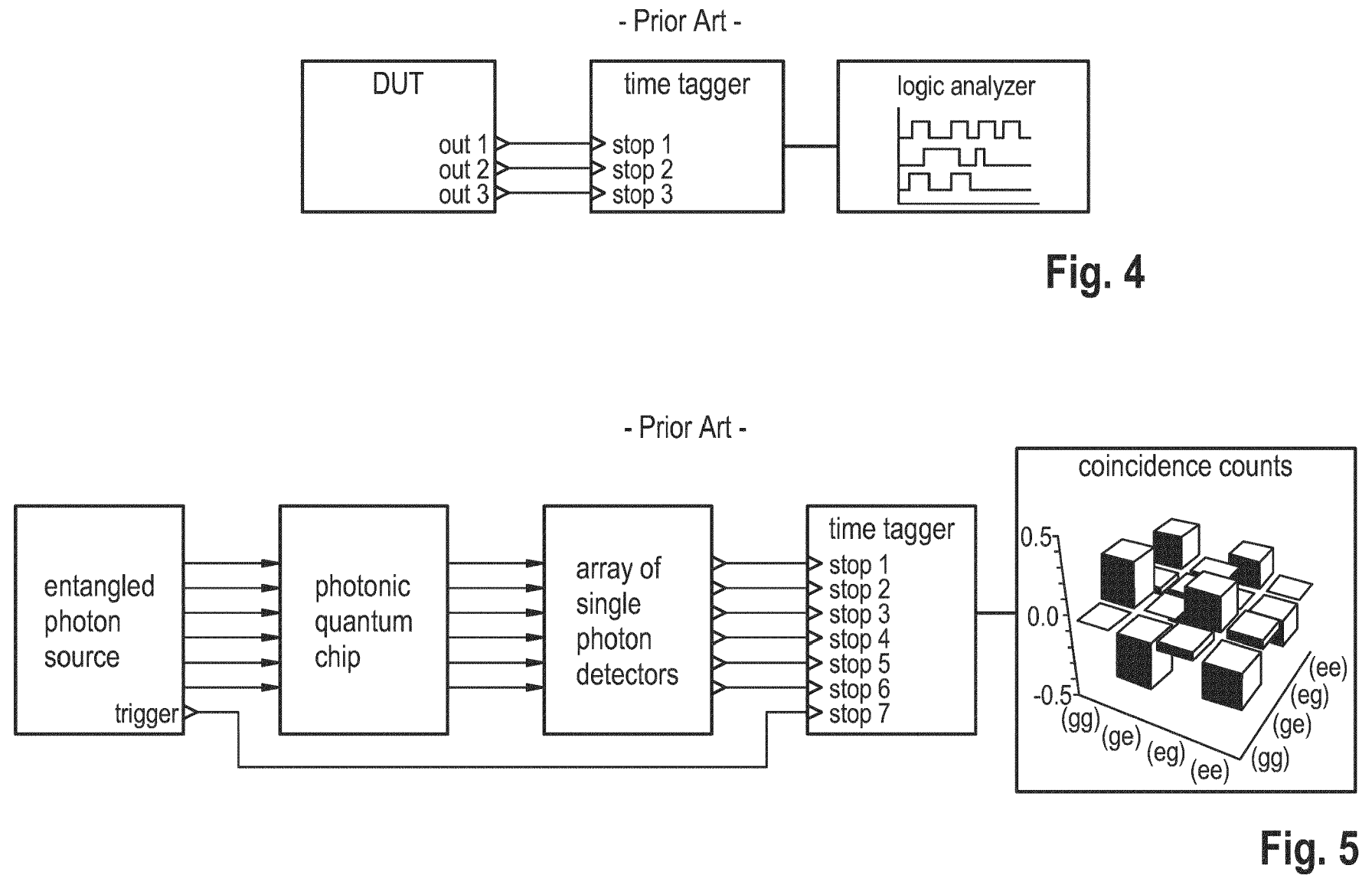

FIG. 4 illustrates a configuration that realizes a logic analyzer with a time tagger FIG. 5 illustrates a configuration that realizes a boson sampling measurement with a time tagger

DETAILED DESCRIPTION OF POSSIBLE EMBODIMENTS OF THE INVENTION

Figure 1:
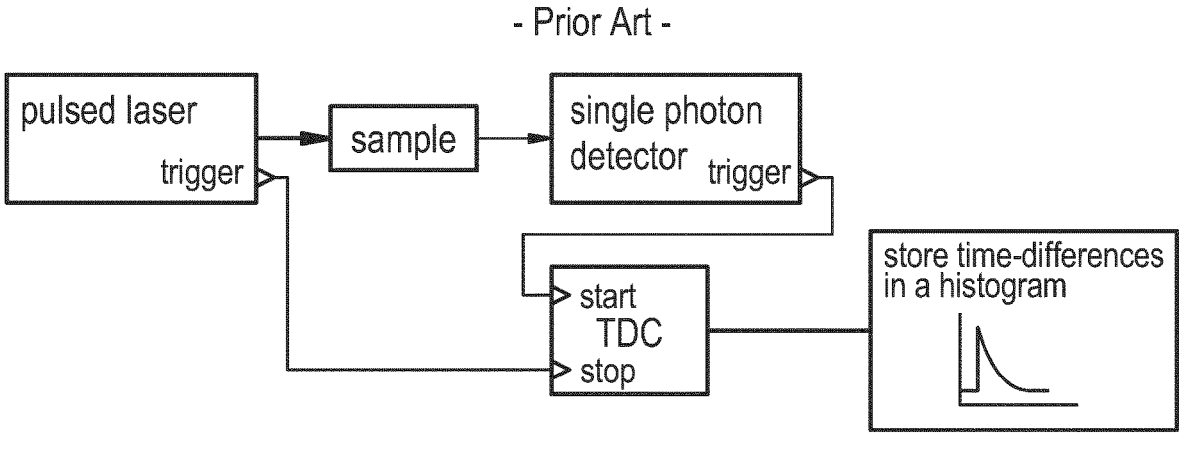
FIG. 1 illustrates a configuration that realizes a fluorescence lifetime measurement with a single TDC.
Figure 2:
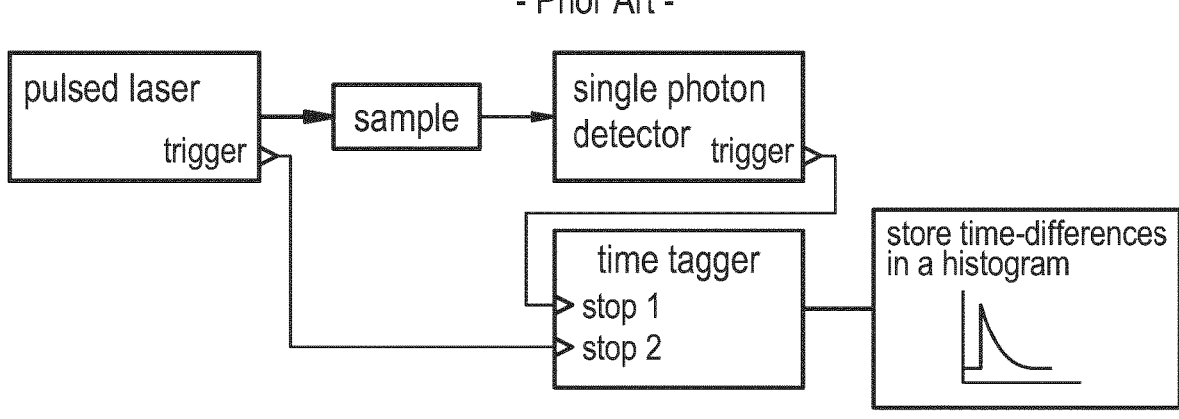
FIG. 2 illustrates a configuration that realizes a fluorescence lifetime measurement with a time tagger
Figure 3:
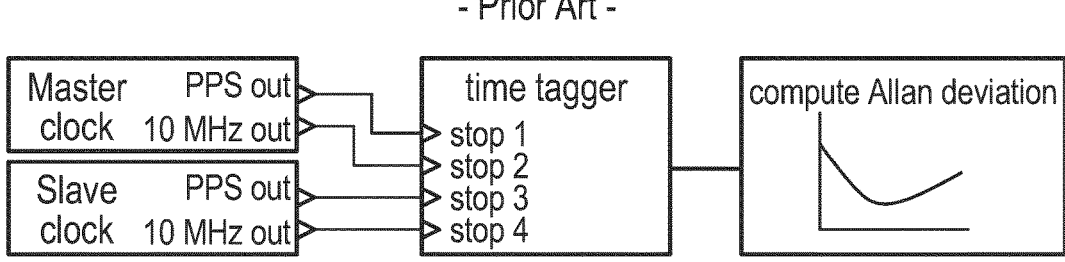
FIG. 3 illustrates a configuration that realizes a clock comparison measurement with a time tagger
Figure 6:
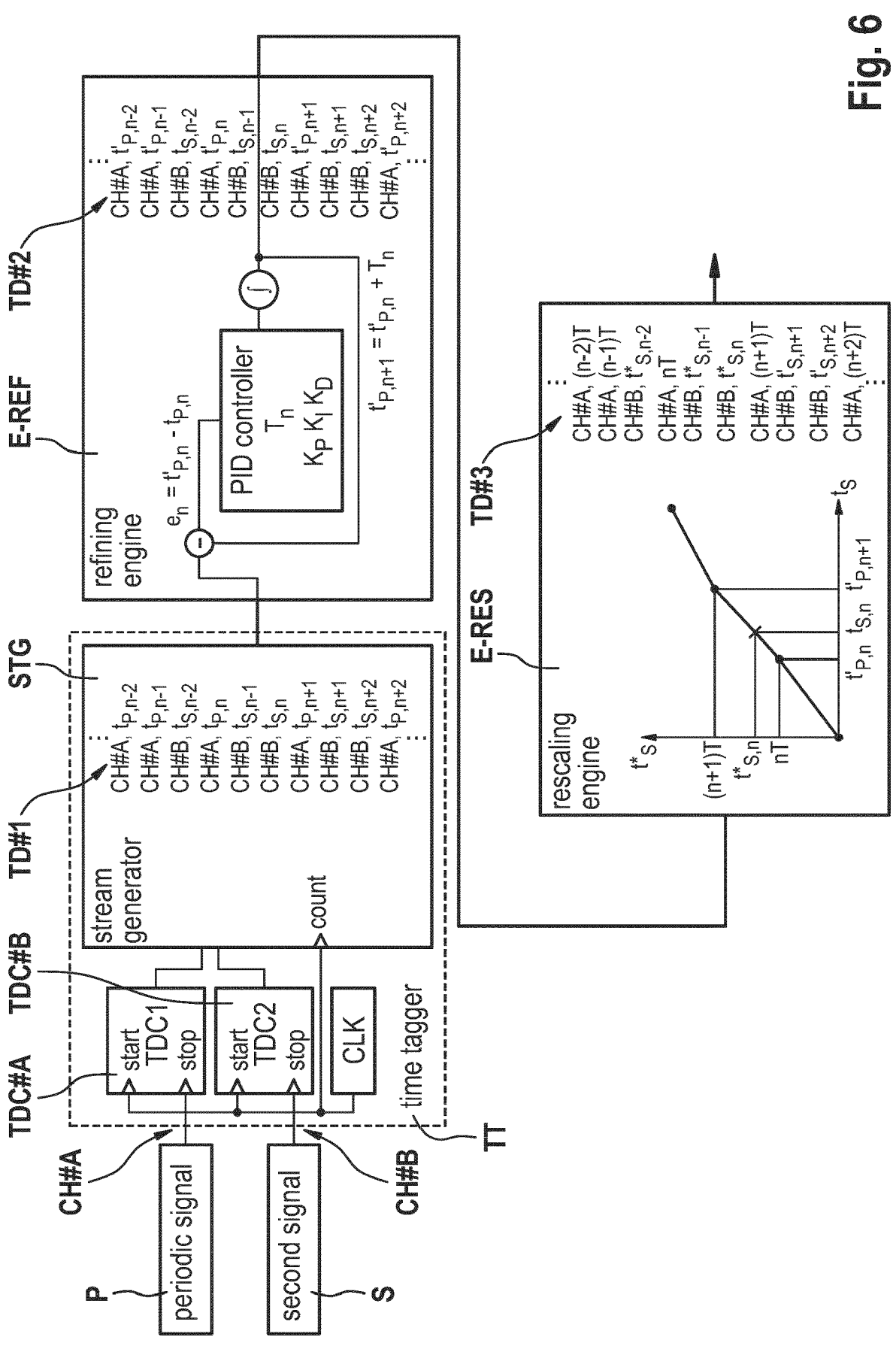
FIG. 6 shows an embodiment of an apparatus for timestamp processing

A possible embodiment of the invention is illustrated in FIG. 6. The embodiment is used for example to realize a fluorescence lifetime measurement with lower jitter and with an improved absolute time reference by exploiting both continuous refinement calculations of the timestamps of a periodic signal and by exploiting continuous interpolation calculations of timestamps to achieve a change of the time reference frame. A periodic pulsed laser with a repetition rate of 80 MHz generates a periodic signal (P) that is connected to a first input (CH #A) of a time tagger (TT). A single photon detector generates a trigger signal(S) for each single photon detection event and is connected to a second input (CH #B) of the time tagger. A quartz and a PLL generate a stable 500 MHz reference clock signal (CLK). TDCs (TDC #A, TDC #B) are implemented in a Field-Programmable-Gate-Array using tapped delay lines. The 500 MHz reference clock is applied to the start inputs of the two TDCs. Here the start inputs are embodied by the latches of the tapped delay lines. The 80 MHz periodic trigger signal and the single photon detector signal are applied to the two stop inputs of the TDCs. Here, the stop inputs are embodied by the delay line inputs. Decoders convert the tapped-delay-line outputs into time differences that provide time values that are at maximum the period of the reference clock, i.e. 2 ns. A stream generator (STG) sorts the time values from the TDCs and combines each time value with a number that identifies the TDC from which it originated. The stream generator also includes a counter that counts the edges of the reference clock and converts the time values into timestamps relative to a specific clock edge that corresponds to time zero, meaning that the timestamps in the data stream are now values much larger than the 2 ns clock period. The timestamps are expressed by integers and an integer number of one corresponds to one picosecond, whereby the 500 MHz reference clock is assumed to have a period of precisely 2 ns, i.e. the 500 MHz reference clock is the absolute time reference. The stream generator also includes counter roll-over markers in the data stream. This timestamp data stream (TD #1) is continuously streamed to a PC, where it is received by a software that includes a receiving engine. The receiving engine converts the time values into 64 bit unsigned integers, taking into account the rollover markers. The timestamp data stream now represents monotonously increasing time values that rollover only after about 0.3 years. So, for a typical application, no rollover is expected to happen and for the sake of all further processing the timestamp data stream can be considered as a stream of consecutive monotonically increasing absolute timestamps.

The timestamp data stream is processed by a refining engine (E-REF) that continuously modifies the timestamps of the periodic laser trigger thereby providing and outputting a modified timestamp data stream (TD #2). The refining engine employs a PID controller that holds and continually refines a value for the period $T_n$. For every measured timestamp, the PID controller calculates the error $e_n = t'_{P,n} - t_{P,n}$ between the measured timestamp $t_{P,n}$ and the refined timestamp $t'_{P,n} = t'_{P,n-1} + T_{n-1}$. Thereby, suitably chosen proportional, integral and differential parameters are used along with the error, its discrete derivative and its integral to calculate an updated period $T_n$. The output timestamp data stream corresponds to the input timestamp data stream except that for all laser timestamps, the original time value is replaced by the refined time value $t'_{P,n}$. Careful selection of the PID parameters is beneficial to achieve robust and accurate operation. The PID parameters are expressed in terms of a damping parameter, which is typically tuned according to the aperiodic limit case, a low pass filter parameter, which is typically selected to be 10 periods, and a periodicity parameter, which is typically selected to be the period.

The final fluorescence lifetime data is obtained by a data processing engine that consumes timestamp data stream TD #1 and calculates for each photon timestamp the time difference to the subsequent laser timestamp and accumulates these time differences in a histogram. Thereby a fluorescence lifetime curve is obtained where the electronic jitter from TDC #A has essentially been removed. The only jitter that remains is the jitter of the single photon detector and electronic jitter of the TDC that processes the triggers from the single photon detector (TDC #B).

Figure 7:
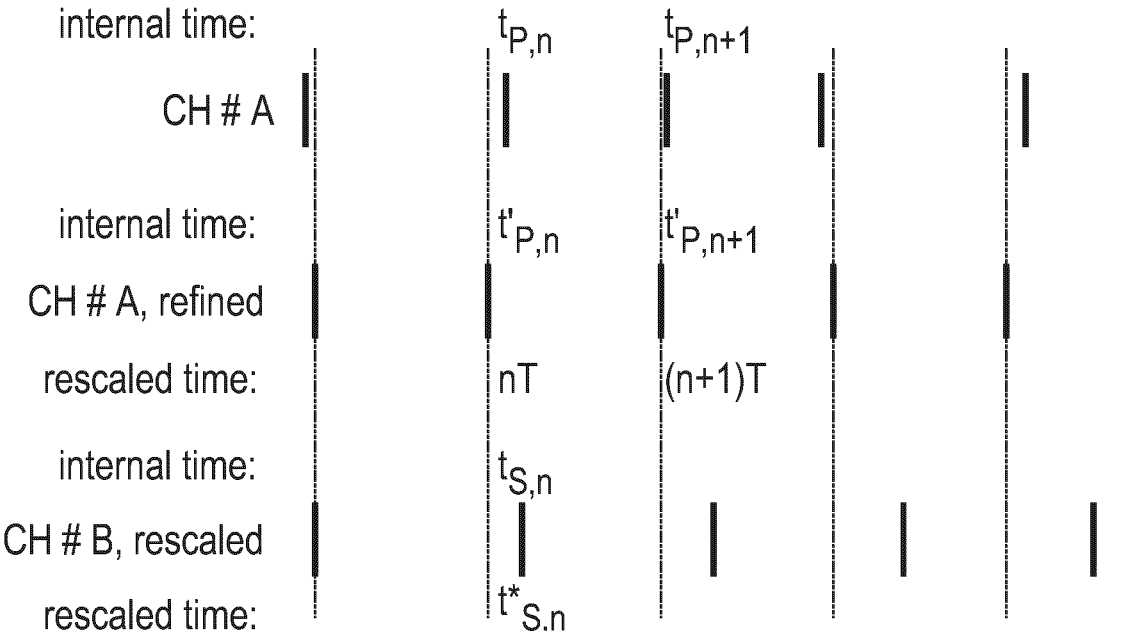
FIG. 7 illustrates the relation of initial, refined and rescaled timestamps

In a second description, the embodiment is directed to compare two clocks. Specifically, quantities such as Allan deviation and Maximum Time Interval Error (MTIE) of one clock are calculated using the other clock as an independent reference. A reference clock, for example an atomic clock outputs a periodic 10 MHz clock signal (P) that is connected to a first input (CH #A) of a time tagger (TT). The frequency of the atomic clock is assigned to be nominally exactly 10 MHz, i.e., its period is assigned to be nominally exactly 100 ns. A second clock outputs a second 10 MHz signal that is applied to a second input (CH #B) of the time tagger. In a first step, refinement calculations of the timestamps corresponding to the atomic clock are performed as described for the case of the fluorescence lifetime measurement, generating a second timestamp data stream (TD #2) containing refined timestamps $t'_{P,i}$. A continuously executed rescaling calculation linearly interpolates the timestamps of the second channel $t_{S,i}$ relative to the refined timestamps, thereby generating new timestamps $t^*_{S,i}$ that express the timestamps of the second channel in the time reference frame of the atomic clock. Specifically, for every initial timestamp $t_{P,n}$ of the atomic clock, a control loop mechanism calculates a refined timestamp $t'_{P,i}$ as described above. The refined timestamps are now used to linearly interpolate the timestamps $t_{S,i}$ of the second clock, expressing them in the time frame of the atomic clock. The relation of the initial, the refined and the rescaled timestamps is illustrated in FIG. 7. Say, the n'th timestamp of the second clock appears between the n'th and (n+1)'th timestamp of the refined atomic clock. The rescaling engine calculates a rescaled timestamp of the second clock as $t^*_{S,n} = nT + T(t_{S,n} - t'_{P,n})/(t'_{P,n+1} - t'_{P,n})$, where T is the nominal clock period. Thereby a new timestamp data stream (TD #3) is generated, where the timestamps of the second clock are replaced by such linearly interpolated timestamps, and the timestamps of the master clock are replaced by timestamps that are integer multiples of the nominal clock period $t^*_{P,n} = nT$.

As a last step a continuously running Allan deviation or MTIE calculation is performed on the rescaled timestamps and the result is displayed in a plot that is continuously updated.

The invention claimed is:

1. An apparatus comprising:
   a. at least two time-to-digital converters (TDCs) that have start and stop inputs and output the time difference between an edge of the start input and an edge of the stop input;
   b. a reference clock that is applied to one of the inputs of each TDC;
   c. a counter that counts the edges of the reference clock;
   d. an electronic circuit or a computer program executed on a processor that converts said time differences into extended time values taking into account the counter value;
   e. the electronic circuit or the computer program executed on the processor that merges said extended time values into a stream of time stamps, where each timestamp consists of an extended time value and a value that identifies the TDC from which it originated;
   f. the timing jitter of the timestamps is smaller than 100 ns;
   g. at least two input signals that are applied to at least two individual TDC inputs;
   h. at least one input signal is periodic or quasi periodic, whereby a quasi periodic signal is a periodic signal in which at least one of the edges is missing;
   i. the electronic circuit or the computer program executed on the processor is continuously executed that and receives a timestamp data stream as an input and generates a new timestamp data stream as an output;
   j. the latency of the electronic circuit or the computer program executed on the processor is less than 1s, meaning that when a new timestamp or a new block of timestamps is provided as an input to the data processing, its calculation is performed in less than 1 s, thereby producing an output timestamp or a block of output timestamps; and k. the electronic circuit or the computer program executed on the processor comprises one or both of the following two calculations:

i. for a periodic or quasi periodic input signal: a continuously updated calculation, whereby estimated timestamps ($t'p_{,1}$) are generated from at least a subset of the initial timestamps ($tp_{,1}$). The estimated timestamps ($t'p_{,1}$) encode the underlying periodic signal and their timing precision is higher than that of the initial timestamps ($tp_{,1}$); and ii. continuously updated rescaling calculation of the timestamps of at least one channel, whereby its timestamps ($ts_{,1}$) are converted to the time reference frame represented by the periodic or quasi periodic input signal, thereby generating rescaled timestamps ($t*s_{,1}$).

2. The apparatus according to claim 1, wherein each estimated timestamp ($t'_{P,i}$), in particular each next estimated timestamps ($t'_{P,\,i+1}$), is determined by a control loop mechanism based on a preceding estimated timestamp ($t'_{P,i}$).

3. The apparatus according to claim 2, wherein said control loop mechanism is a PID controller.

4. The apparatus according to claim 3, wherein the proportional, integral, and differential control parameters ($K_P$, $K_I$, $K_D$) of the PID controller are reparametrized in terms of a limit frequency, a damping parameter, and an expected period.

5. The apparatus according to claim 4, where at least one of the control parameters or reparametrized control parameters is determined automatically from the initial timestamps ($t_{P,i}$) by the electronic circuit or the computer program executed on the processor.

6. The apparatus according to claim 1, wherein said rescaled timestamps ($ts_{,i}$) are obtained by an interpolating function (IF) using at least two initial ($t_{P,i}$) or estimated ($t'_{P,i}$) timestamps.

7. The apparatus according to claim 6, wherein said interpolation is a linear interpolation based on exactly two initial or estimated timestamps.

\* \* \* \* \*